June 23, 1959  P. W. KRUSE  2,892,096
IMAGE INTENSIFIERS
Filed Aug. 30, 1956

INVENTOR.
PAUL W. KRUSE
BY
*George A. Gust*
ATTORNEY

United States Patent Office 2,892,096
Patented June 23, 1959

2,892,096

IMAGE INTENSIFIERS

Paul W. Kruse, Fort Wayne, Ind., assignor to International Telephone and Telegraph Corporation Application August 30, 1956, Serial No. 607,192

5 Claims. (Cl. 250—213)

This invention relates to image intensifiers and is particularly directed to devices for increasing the level of illumination of pictures projected on a viewing surface such as a screen.

Image intensifiers for black and white pictures have heretofore been proposed comprising a sandwich of a thin layer of photoconductive material laid on a layer of electroluminescent phosphor with transparent conductive films against the outside surfaces of the sandwich. When the photoconductor is illuminated, its resistance drops and a greater proportion of the voltage across the film electrodes is applied to the electroluminescent phosphor, causing it to luminesce in proportion to the incident light. Light gains of such intensifiers have been found to be as high as 50.

The object of this invention is to provide an improved image intensifier for reproducing and intensifying pictures containing colors.

The objects of this invention are attained by depositing in straight parallel lines, on a transparent conductive film on a glass surface, three electroluminescent phosphor materials, the materials being responsive to an alternating electric field for emanating light in the three different primary colors. The entire phosphor-rastar is then overlaid with a thin layer of photoconductive material, which material is in turn overlaid with the second transparent conductive film. The voltage of a source connected between the two conductive films will then be divided potentiometer-fashion between the phosphor and photoconductive layers in accordance with the incident light projected thereon. According to this invention, light of the primary colors is selectively deflected to the particular element of the photoconductor overlying the electroluminescent phosphor corresponding to that color. The selective deflection is accomplished by long parallel transparent prismatic strips of high dispersive power and overlying each of the inter-digital groups of the three phosphor lines.

Figure 1:
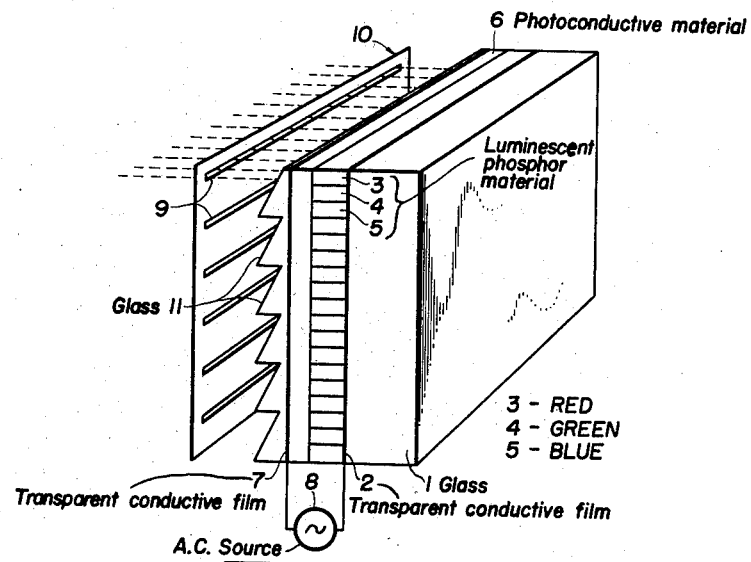
Figure 2:
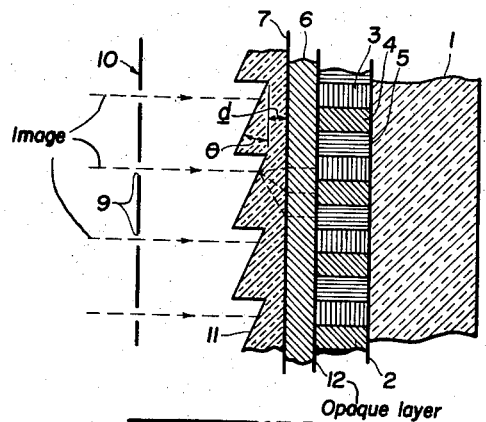

The above mentioned and other features and objects of this invention and the manner of attaining them will become more apparent and the invention itself will be best understood by reference to the following description of an embodiment of the invention taken in conjunction with the accompanying drawings, wherein:

Fig. 1 of the drawing shows in perspective the image intensifier of this invention; and Fig. 2 shows in detail a vertical section through the device.

The image intensifier of this invention comprises a glass plate 1 of good quality plate or optical glass. To one face of the plate is applied the transparent film 2. The phosphor strips 3, 4 and 5 repeated in groups across the face of the plate are next laid down. The phosphors 3, 4 and 5 produce light, respectively, of the three primary colors, red, green and blue when electrically excited. Immediately overlying the phosphors is the layer 6 of photoconductive material to the surface of which is applied the second electrode 7 of a transparent conducting film. Electrodes 2 and 7 are connected to an alternating voltage source 8, the voltage level of which is selected to cause the phosphors to glow when incident light falls on the photoconductor 6. Incident light is collimated by slits 9 in the screen 10 and is directed to the side of the prisms 11. The dispersive power and the angles and thickness of the prisms are so chosen that the sheets of light will be refracted to the areas overlying the phosphors of corresponding color.

More specifically, the image intensifier of this invention comprises the glass plate 1 of the desired surface area and of sufficient thickness to be self-supporting. The electrode 2 is formed preferably by condensing stannic chloride vapor upon the glass 1 at an elevated temperature in the commercially known "Nesa" coating process developed by the Pittsburgh Plate Glass Co. and described in U.S. Patent No. 2,624,857.

The three phosphors 3, 4 annd 5 are then laid down, as by successively spraying the material on the plate with suitable masks for confining each sprayed layer to narrow, well-defined strips. The phosphors may comprise, for example, zinc sulphide electroluminescent powder with impurities added to produce the desired spectral responses. For example, pure zinc sulphide has a peak light output in the blue region while zinc sulphide doped with chlorine has a peak output in the green light region. Red phosphors may be prepared by mixing zinc sulphide with small quantities of manganese. The width of each phosphor strip laid down will depend upon the size of the screen and upon the resolution desired. For screens of the size useful in home television, the phosphor strips should be limited in width to about eight mils, so that the three strips occupy about 24 mils.

The photoconductor 6 is then laid down by precipitating or painting any good photoconductive powder such as cadmium sulphide doped with copper and chlorine which has high dark resistance and is sensitive to all wavelengths of visible light.

The second electrode 7 is applied in transparent thickness to the surface of the prism sheet 11 which is adjacent to the photoconductor 6. If the transparent electrode is deposited from the vapor it is preferably done on the back of the prism sheet rather than on the photoconductor, which is somewhat porous.

Finally, the prism strips 11 are positioned over and parallel to the strip groups of phosphors. The prisms may, for example, be made by casting a grooved sheet of optical glass having a high dispersive power, such as a heavy flint glass. The index of refraction for the solar "D" line (yellow) of the heaviest flint glass is 1.9626 and the dispersion of the solar "F" (blue) and "C" (red) lines is 0.04882. The angle $\theta$ of the prisms and the thickness $d$, Fig. 2, of the prism 11 are selected such that the primary colors of the incident light ray are dispersed sufficiently upon reaching the photoconductor 6 that they activate the proper phosphor strips 3, 4 and 5. The grooved sheet is carefully oriented on the plate so that the prism boundaries are parallel to the phosphor strips. Displacement of the prisms with respect to the phosphor strips is easily made before the prisms and plate are clamped or glued together. Proper orientation of the prisms with respect to the phosphor strips prior to fastening is achieved by projecting monochromatic light, for example green, upon the prisms through the slits and then displacing the prisms with respect to the phosphor such that only the green lines luminesce.

It would be well to add a thin opaque layer 12 of dielectric material between the photoconductor and the phosphor layers in order to prevent light from the phosphor feeding back to the photoconductor and producing an undesirable spreading of the image or even holding action. Such a layer can be made by mixing lamp black in plastic. The layer must be thin, such as about one-tenth the thickness of the phosphor, in order that it has a low electrical impedance and does not have a high voltage drop across it. The frequency of the source 8 is selected to cause proper voltage division between the photoconductor and phosphor films and also permit a high level of display brightness when the photoconductor is excited. Phosphor brightness is proportional to 0.7 power of frequency, it having been found that phosphor acts as a capacitive element, photoconductor as resistive.

While the principles of the invention have been described in connection with specific apparatus, it is to be clearly understood that this description is made only by way of example and not as a limitation to the scope of the invention.

What is claimed is:

1. An image intensifier having a layer of photoconductive materials and a layer of electroluminescent materials sandwiched between transparent conducting films of good electrical conductivity, characterized in that the electroluminescent materials are of three kinds luminescing in three primary colors and are laid down in repeating groups of long narrow parallel strips, and means for selectively directing components of incident light of different wavelengths to those portions of the photoconductive layer overlying the strips of electroluminescent materials which luminesce in a color of said wavelength components.

2. In an image intensifier, a layer of electroluminescent materials of three kinds, each kind luminescing in one of three primary colors, and each kind being laid down in repeating groups of long narrow parallel strips, a layer of photoconductive materials on said layer of electroluminescent materials, means for applying a field across said two layers, and means for selectively directing different wavelength components of incident light to strips of corresponding color.

3. An image intensifier comprising a transparent self-supporting glass plate, a first transparent electrode deposited on said plate, repeating groups of strips of three electroluminescent phosphors on said first electrode, a photoconductor layer on the phosphors, a second transparent electrode on said photoconductive layer, and an elongated prismatic strip overlying each of said phosphor groups, and means for collimating incident light on the prisms.

4. An image intensifier for color pictures comprising in combination a first transparent metallic film, a layer of electroluminescent phosphors, an opaque layer, a layer of photoconductive material, a second transparent metallic film, a prism of predetermined dispersing power, and means for collimating light on said prism.

5. In the combination defined in claim 4, said metallic films, phosphors, opaque layer, and photoconductive materials being juxtaposed in closed proximity in the order named.

References Cited in the file of this patent
UNITED STATES PATENTS

| | | |
|---|---|---|
| 2,612,614 | Amdursky | Sept. 30, 1952 |
| 2,792,447 | Kazan | May 14, 1957 |